US010059050B2

(12) United States Patent
Houck

(10) Patent No.: US 10,059,050 B2
(45) Date of Patent: Aug. 28, 2018

(54) METHOD OF VACUUM FORMING AN OBJECT USING A FLEXIBLE MOLD AND AN APPARATUS FOR VACUUM FORMING AN OBJECT

(71) Applicant: GM GLOBAL TECHNOLOGY OPERATIONS LLC, Detroit, MI (US)

(72) Inventor: Thomas E. Houck, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 812 days.

(21) Appl. No.: 14/557,516

(22) Filed: Dec. 2, 2014

(65) Prior Publication Data

US 2016/0151958 A1 Jun. 2, 2016

(51) Int. Cl.
| | |
|---|---|
| B29C 51/34 | (2006.01) |
| B29C 33/50 | (2006.01) |
| B29C 51/10 | (2006.01) |
| B29C 51/44 | (2006.01) |
| B29C 51/42 | (2006.01) |
| B29C 51/36 | (2006.01) |
| B29C 33/38 | (2006.01) |
| B29C 33/48 | (2006.01) |
| B29L 31/40 | (2006.01) |
| B29C 33/40 | (2006.01) |

(52) U.S. Cl.
CPC .......... *B29C 51/34* (2013.01); *B29C 33/3857* (2013.01); *B29C 33/485* (2013.01); *B29C 33/50* (2013.01); *B29C 51/10* (2013.01); *B29C 51/36* (2013.01); *B29C 51/425* (2013.01); *B29C 51/44* (2013.01); *B29C 33/405* (2013.01); *B29L 2031/40* (2013.01)

(58) Field of Classification Search
None
See application file for complete search history.

(56) References Cited

U.S. PATENT DOCUMENTS 3,898,315 A * 8/1975 Haag ................ B29C 51/34
264/312

FOREIGN PATENT DOCUMENTS

| CN | 1982035 A | 6/2007 |
|---|---|---|
| CN | 101590692 A | 12/2009 |
| CN | 102061491 A | 5/2011 |

(Continued)

OTHER PUBLICATIONS

Guo, "Mold Design", Jan. 31, 2010, p. 229, Qingliang China Light Industry Press, ISBN 978-7-5019-7104-6.

(Continued)

*Primary Examiner* — Monica Huson
(74) *Attorney, Agent, or Firm* — Quinn IP Law

(57) ABSTRACT

A method of vacuum forming an object includes heating a plastic sheet. After heating the plastic sheet, a vacuum is applied to pull the sheet against an outer surface of a flexible mold so that the plastic sheet has a formed shape that conforms to a contoured shape of the outer surface of the flexible mold. A rigid core is withdrawn from a cavity in the flexible mold. The flexible mold is then withdrawn from the plastic sheet by applying force to the flexible mold in a single direction, thereby causing flexing of the flexible mold past the undercut. An apparatus for vacuum forming a plastic sheet includes the flexible mold.

12 Claims, 6 Drawing Sheets

(56) References Cited

FOREIGN PATENT DOCUMENTS

| CN | 203792699 U | 8/2014 |
|---|---|---|
| JP | 5485262 B2 | 5/2014 |
| WO | 9955985 A1 | 11/1999 |

OTHER PUBLICATIONS

E.Keller et.al., "Mold, Frock Clamp Manufacture Practical Technology", Jan. 31, 2011, p. 143, Mechanical Industry Press, ISBN 978-3-8085-1203-6.
Editorial Board of "Plastic Mold Technique Manual", Jun. 30, 1997, p. 818, Mechanical Industry Press, ISBN 7-111-05348-6.
State Intellectual Property Office of the People's Republic of China, Second Office Action for Chinese Patent Application No. 201510854638.6, dated Mar. 9, 2018.

* cited by examiner

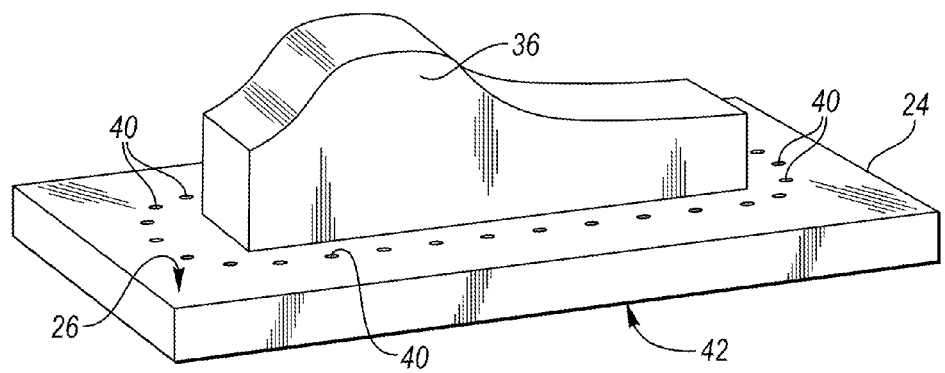
FIG. 5
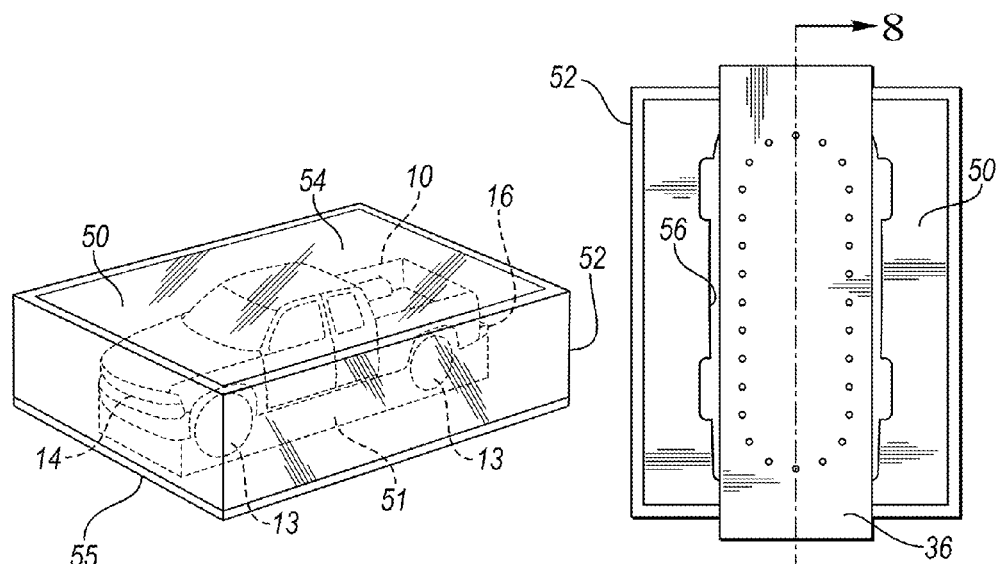
FIG. 6
FIG. 7
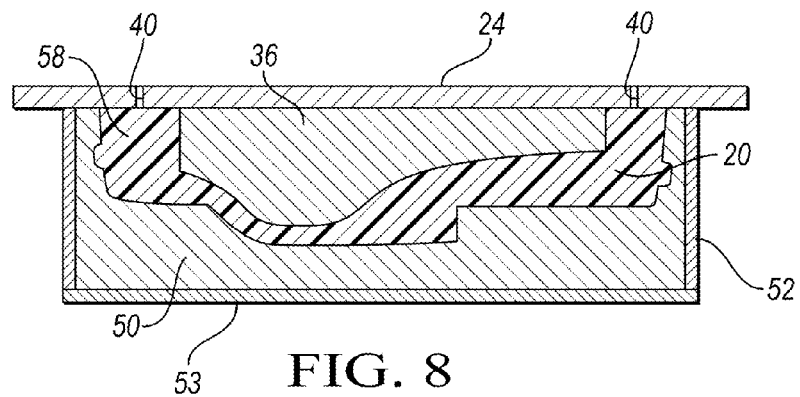
FIG. 8

METHOD OF VACUUM FORMING AN OBJECT USING A FLEXIBLE MOLD AND AN APPARATUS FOR VACUUM FORMING AN OBJECT

TECHNICAL FIELD

The present teachings generally include a method of vacuum forming an object and an apparatus for vacuum forming an object.

BACKGROUND

Vacuum forming is a process by which a plastic sheet is heated and then formed to the shape of a die by applying a vacuum to draw the sheet against the surface of the object. The die must then be withdrawn. Objects suitable for vacuum forming on a unitary rigid die have heretofore been limited to those that do not have undercuts, as an undercut prevents withdrawal of the die from the formed sheet without damage to the formed sheet. Alternatively, a complex, costly die with sliding die portions would be required to allow removal of the sheet.

SUMMARY

A method of vacuum forming an object includes heating a plastic sheet. After heating the plastic sheet, a vacuum is applied to conform pull the plastic sheet to a contoured shape of an outer surface of a flexible mold so that the plastic sheet has a formed shape that includes an undercut. Typically, such an undercut would cause a die lock condition. Vacuum forming of an object to achieve such a formed shape was therefore not an option. However, under the method disclosed herein, a rigid core is withdrawn from a cavity in the flexible mold. The flexible mold is then withdrawn from the plastic sheet by applying force to the flexible mold in a single direction, thereby causing flexing of the flexible mold past the undercut. Because the mold is flexible, the plastic sheet is formed to replicate the object, including the undercut. Thus, objects with undercuts that previously required more costly processes, such as a complex die assembly with slides, or injection molding, can instead be vacuum formed.

An apparatus for forming an object from a plastic sheet includes a mold having an inner surface defining a cavity and having an outer surface that has a contoured shape. A rigid core is configured to fit within the cavity. A vacuum source is positioned to vacuum form the plastic sheet to the outer surface of the mold to form the object having a formed shape, including an undercut, that conforms to the contoured shape of the mold. The formed shape includes an undercut. The mold is flexible, allowing the mold to be withdrawn from the plastic sheet past the undercut by applying force in a single direction after the rigid core is withdrawn from the cavity.

The above features and advantages and other features and advantages of the present teachings are readily apparent from the following detailed description of the best modes for carrying out the present teachings when taken in connection with the accompanying drawings.

BRIEF DESCRIPTION OF THE DRAWINGS

FIG. 5 is a schematic illustration in perspective view of the rigid core supported on the base of FIG. 4.

FIG. 6 is a schematic illustration in perspective view of a container containing the article of FIG. 1 in mold material.

FIG. 7 is a schematic illustration in plan view of the container of FIG. 6 with the base suspending the rigid core above a female mold formed in FIG. 6.

FIG. 8 is a schematic cross-sectional illustration taken at lines 8-8 in FIG. 7 of the rigid core suspended above the female mold formed in FIG. 6 and with mold material poured in a gap to create the flexible mold of FIG. 4.

DETAILED DESCRIPTION

Figure 1:
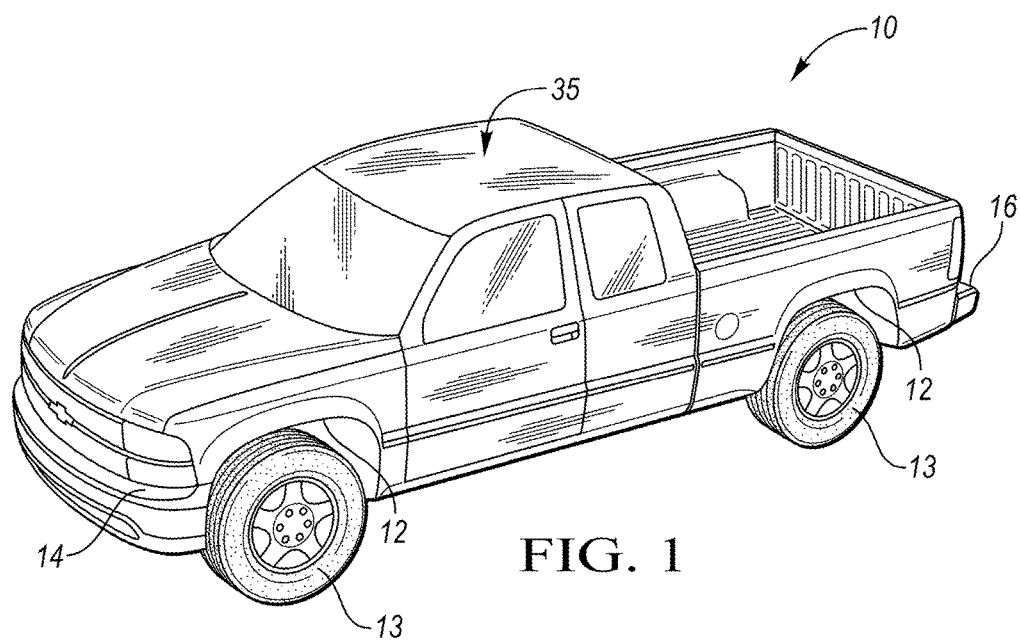
FIG. 1 is a schematic illustration in perspective view of an article to be replicated that is a scale model of a pickup truck to be replicated.
Figure 2:
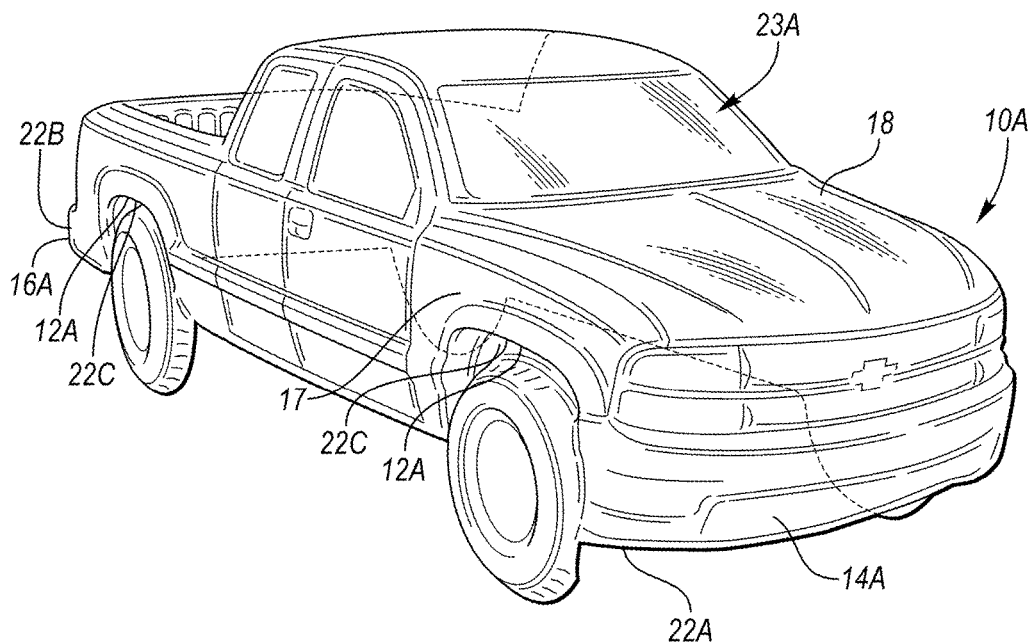
FIG. 2 is a schematic illustration in perspective view of a vacuum-formed plastic sheet replicating the scale model of FIG. 1.
Figure 3:
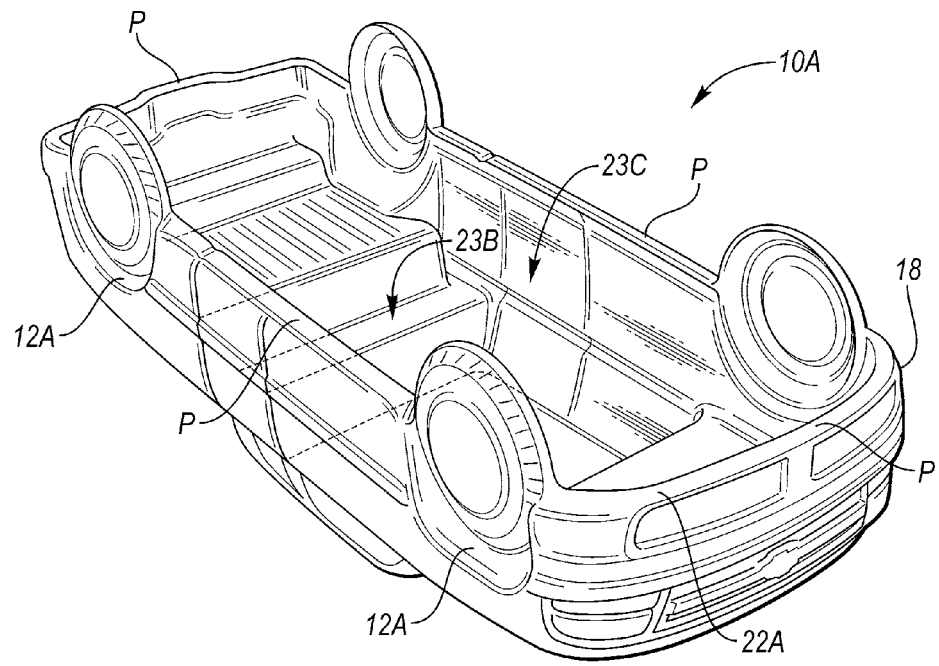
FIG. 3 is a schematic illustration in another perspective view of the vacuum-formed plastic sheet of FIG. 2.
Figure 11:
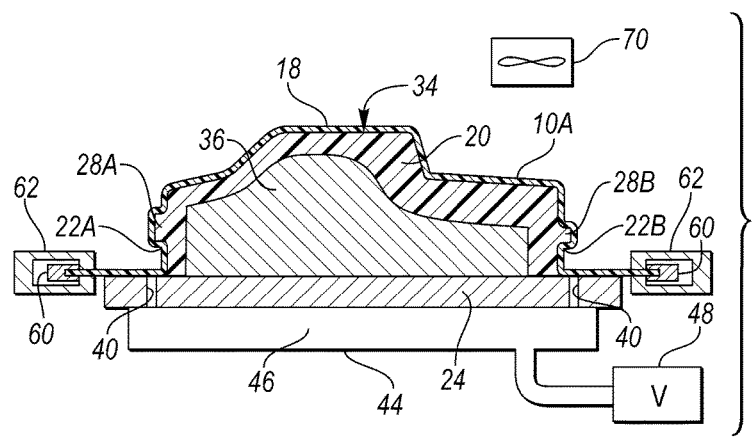
FIG. 11 is a schematic illustration in cross-sectional view of the plastic sheet vacuum formed to the flexible mold of FIG. 4 and showing a cooling fan.
Figure 14:
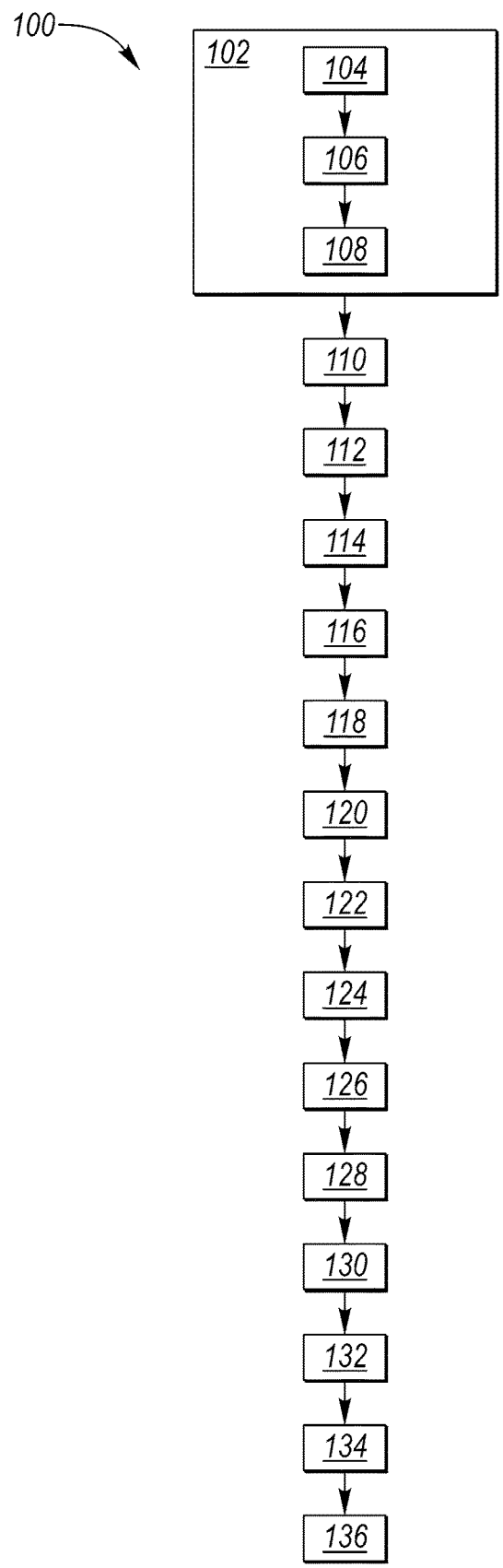
FIG. 14 is a flow diagram of a method of vacuum forming an object.

Referring to the drawings, wherein like reference numbers refer to like components throughout the views, FIG. 1 shows an article 10 to be replicated by a method 100 described herein and represented in the flow diagram of FIG. 14. The article 10 is a scale model of a pickup truck. It should be appreciated that the article 10 is only one example embodiment of an article that can be replicated by the method 100, and the method 100 can be applied to replicate other articles. More specifically, the method 100 is particularly useful for replicating an article that has an undercut that creates a die lock condition that makes a conventional vacuum forming process with a unitary rigid die unusable. As used herein, an "undercut" is an angle of a portion of the outer surface of the formed object relative to a base on which a mold for the object is mounted that makes it impossible to remove the mold from the formed object by applying only a force in a single direction to the mold. For example, the article 10 of FIG. 1 has wheel wells 12 over tire and wheel assemblies 13, a front bumper 14 and a rear bumper 16, all of which result in undercuts in a vacuum formed plastic sheet 18 formed over a flexible mold 20 of the article 10, as shown in FIG. 11. The object 10A formed from the plastic sheet 18 has undercuts 22A, 22B at the replicated front and rear bumper 14A, 16A, respectively due to protrusion of the bumpers 14, 16. Deeper undercuts 22C exist at the replicated wheel wells 12A shown in the object 10A in FIG. 2 due to protrusion of the vehicle body portion 17 above the wheel wells 12A. As shown in FIGS. 2 and 3, the object 10A is formed from only the single plastic sheet 18, and has a contoured outer surface 23A, and an opposite, contoured inner surface 23B that defines a cavity 23C.

Figure 4:
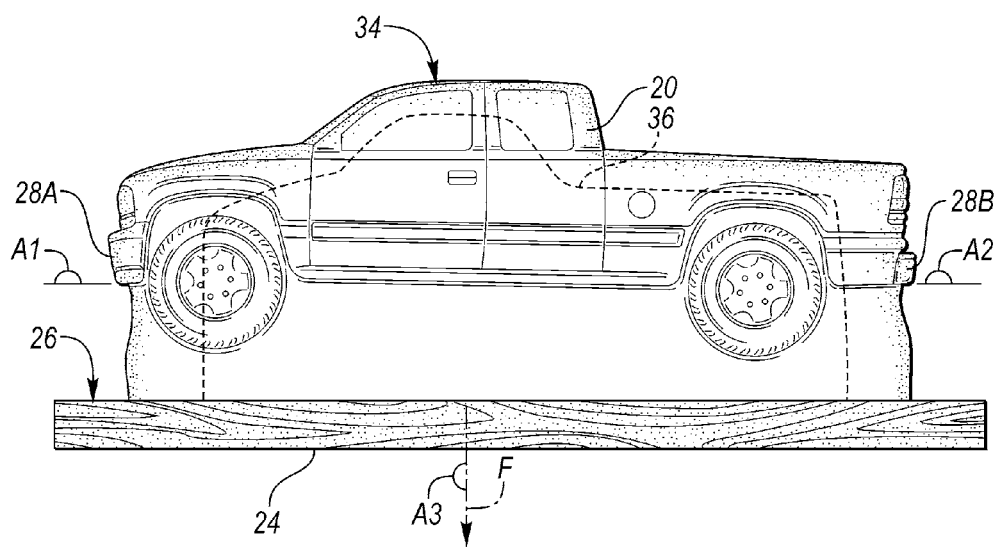
FIG. 4 is a schematic illustration in side view of a flexible mold supported on a rigid core (shown in hidden lines) and on a base.
Figure 13:
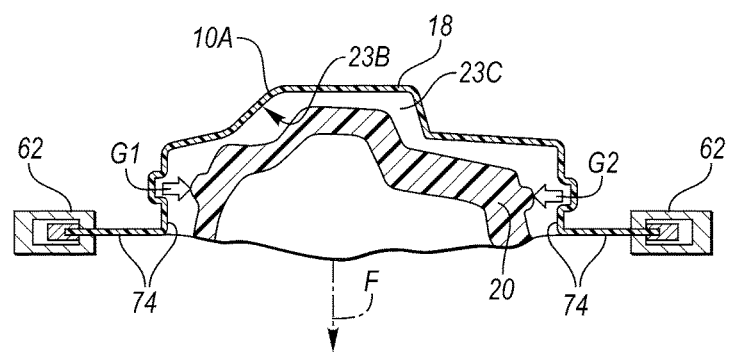
FIG. 13 is a schematic illustration in cross-sectional view of the flexible mold flexing to move past undercuts in the vacuum formed sheet.

As shown in FIG. 4, the flexible mold 20 is mounted to a base 24 in a manner described in greater detail herein. The base 24 has a base surface 26 that is planar. The undercut 22A of the formed sheet 18 (shown in FIG. 3) formed by a protruding portion 28A of the flexible mold 20 forms a first angle A1 relative to the base surface 26. Because the undercut 22A is parallel with the base surface 26, the first angle A1 is 0 degrees when measured in a clockwise manner (left to right in FIG. 4) from the base surface 26, or 180 degrees when measured in a counterclockwise manner (right to left in FIG. 4) from the base surface 26. A protruding portion 28B of the flexible mold 22 causes the undercut 22B in the formed sheet 18 (shown in FIG. 3) that has a similar angle A2. The force F applied to remove the mold 20 from the cavity 23C formed in the object 10A in FIG. 13 is perpendicular to the base surface 26, such as a downward direction shown in FIGS. 4 and 13. The force F thus forms a second angle A3 relative to the base surface 26 that is 90 degrees as shown in FIG. 4. In a traditional vacuum forming process with a single, integral, non-flexible (i.e., rigid) mold, withdrawal of such a mold past the undercuts 22A, 22B, 22C would be impossible.

Figure 12:
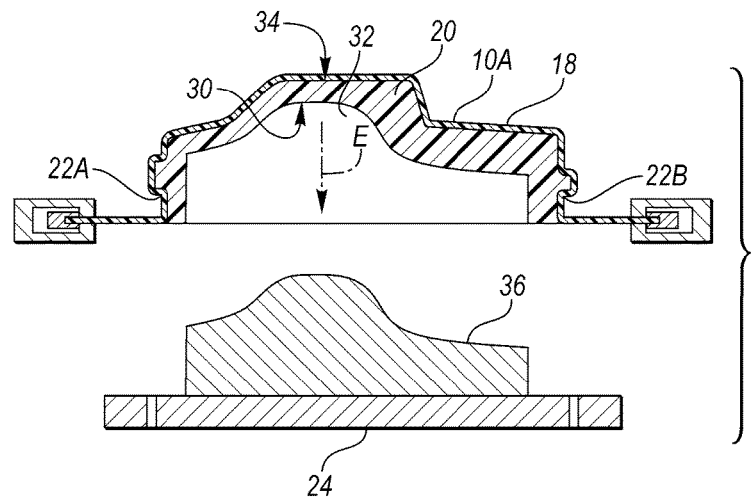
FIG. 12 is a schematic illustration in cross-sectional view of the rigid core withdrawn from the flexible mold.

The method 100 enables the use of the flexible mold 20 that is of a flexible material such as silicone. As best shown in FIG. 12, the flexible mold 20 has an inner surface 30 defining a cavity 32, and has an outer surface 34. The flexible mold 20 is formed as described herein so that the outer surface 34 has a contoured shape that is complementary to and mates with the formed shape of the object 10A. In other words, the outer surface 34 of the flexible mold 20 is in contact with and is coextensive with the inner surface 23B of the object 10A (shown in FIG. 3) prior to withdrawal of the flexible mold 20 from the object 10A. The outer surface 34 is also substantially identical to the contoured shape 35 of the outer surface of the article 10 (shown in FIG. 1).

FIG. 5 shows a rigid core 36 that is mounted on the base 24. The rigid core 36 fits within the cavity 32 of the flexible mold 20 as is apparent in FIGS. 11 and 12. The rigid core 36 is shown with hidden lines in FIG. 4, and is best shown in FIGS. 5 and 11. FIG. 5 shows that the base 24 has a series of openings 40, only some of which are numbered in FIG. 5. Each of the openings 40 extends entirely through the thickness of the base 24, from the surface 26 to an opposing surface 42. The openings 40 extend around the rigid core 36 on the base 24. As shown in FIG. 11, a casing 44 creates a manifold 46 extending from a vacuum source (V) 48 to the openings. Accordingly, the vacuum source 48 can apply a vacuum at the surface 26 through the openings 40.

FIGS. 6-8 illustrate how the flexible mold 20 of FIG. 4 is made. The method 100 may include making the flexible mold 20 according to the steps 102-114, or the method may begin with a pre-made flexible mold 20 made according to the steps 102-114. First, step 102 includes creating a female mold 50 that is then used to create the flexible mold 20, which is a male mold. Step 102 includes sub-step 104, placing the article 10 into a container 52. In sub-step 106, mold material 54 for the female mold 50 is then poured or otherwise placed into the container 52 around the article 10. FIG. 6 shows the mold material 54 poured over the article 10 to create the female mold 50. Clay 51 may be placed under the article, between the wheels 12 and from bumper 14 to bumper 16 to prevent mold material 54 from going under the article 10 when poured into the container 52. The mold material 54 may be a two-part silicone material. Once the mold material 54 is set, a cover 53 (shown in FIG. 8) is placed on top of the open container 52 in FIG. 6, and the container 52 is inverted relative to its position during steps 102-106, as shown in FIGS. 7 and 8. A portion 55 of the container 52 that was previously on the bottom of the container 52, as shown in FIG. 6, is then removed to reveal the mold 50, as shown in FIG. 7. The article 10 and any clay 51 thereunder is removed from the container 52 in sub-step 108, leaving a void 56 having a shape of the article 10, as partially shown in FIG. 7. The female mold 50 is now complete.

Next, the method 100 proceeds to suspending the rigid core 36 above the female mold 50 in the container 52 in step 110 so that a gap 58 exists between the female mold 50 and the rigid core 36. FIG. 8 shows the gap 58 already filled with mold material 60 for the flexible mold 20, per the subsequent step 112, pouring mold material 60 for the flexible mold 20 into the gap 58. The mold material 60 may be silicone. The resulting flexible mold 20 has an outer surface 34 (best shown in FIG. 4) with a contoured shape that is the same as the contoured shape of the outer surface 23A of the article 10 as a result of forming the female mold 50 around the article 10 as described with respect to FIG. 6.

Next, in step 114, the flexible mold 20 is separated from the female mold 50 by withdrawing the base 24 and rigid core 36 from the container 52 and flexing the mold 20 out of the female mold 50. Next, in step 116, the flexible mold 20 is again placed on the rigid core 36 which is supported on the base 24, as best shown in FIGS. 4 and 11. More specifically, the rigid core 36 is placed in the cavity 32 of the flexible mold 20.

Figure 9:
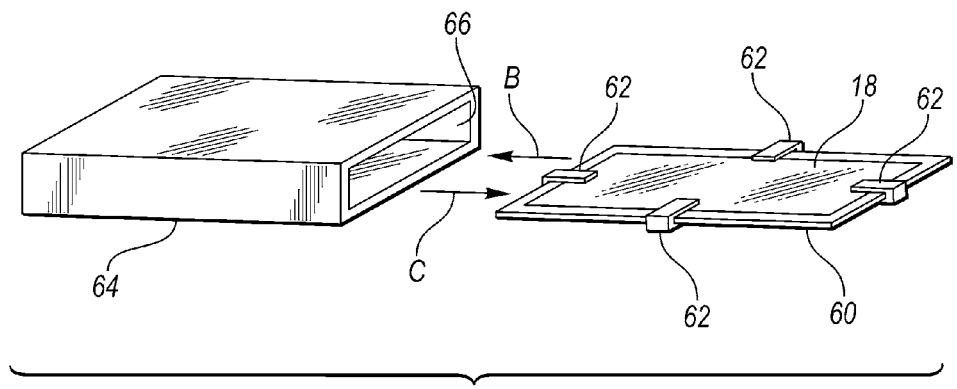
FIG. 9 is a schematic illustration in perspective view of the plastic sheet clamped to an oven tray and an oven into which the tray is inserted and removed.

The plastic sheet 18 is then prepared for vacuum forming. The plastic sheet may be polyethylene terephthalate (PTEG), Acrylonitrile butadiene styrene (ABS), Polypropylene (PP), thermoplastic, or another polymeric material suitable for vacuum forming. In step 118, the plastic sheet 18 is clamped to an oven tray 60. FIG. 9 shows an oven tray 60 with clamps 62 that can be tightened to secure the plastic sheet 18. Optionally, the oven tray 60 could be sandwiched between an upper frame and a lower frame, each of which may be rectangular similar to the over tray 60. The clamps 62 could then clamp the frames together to secure the over tray and sheet 18 between the frames. Any suitable arrangement to secure the sheet 18 relative to the oven tray 60 can be used. The oven tray 60 with the plastic sheet 18 clamped thereto is then moved at least partially into an entrance 66 of an oven 64 in step 120 as indicated by the directional arrow B. The plastic sheet 18 is then heated in the oven 64 in step 122. After a predetermined amount of time in the oven 64, the oven tray 60 and plastic sheet 18 are removed from the oven 64 in step 124, as indicated by arrow C. The predetermined amount of time may be selected to ensure that the plastic sheet 18 reaches a predetermined temperature required for vacuum forming. A timer and/or temperature sensors may be used to monitor heating of the sheet 18. Movement of the oven tray 60 into and out of the oven 64 could be done manually or could be automated. If the movement is automated, a robotic arm (not shown) could support and move the oven tray 60. A person skilled in the art would readily understand the ability of a robotic arm to move the oven tray 60 into and out of the oven 64.

Figure 10:
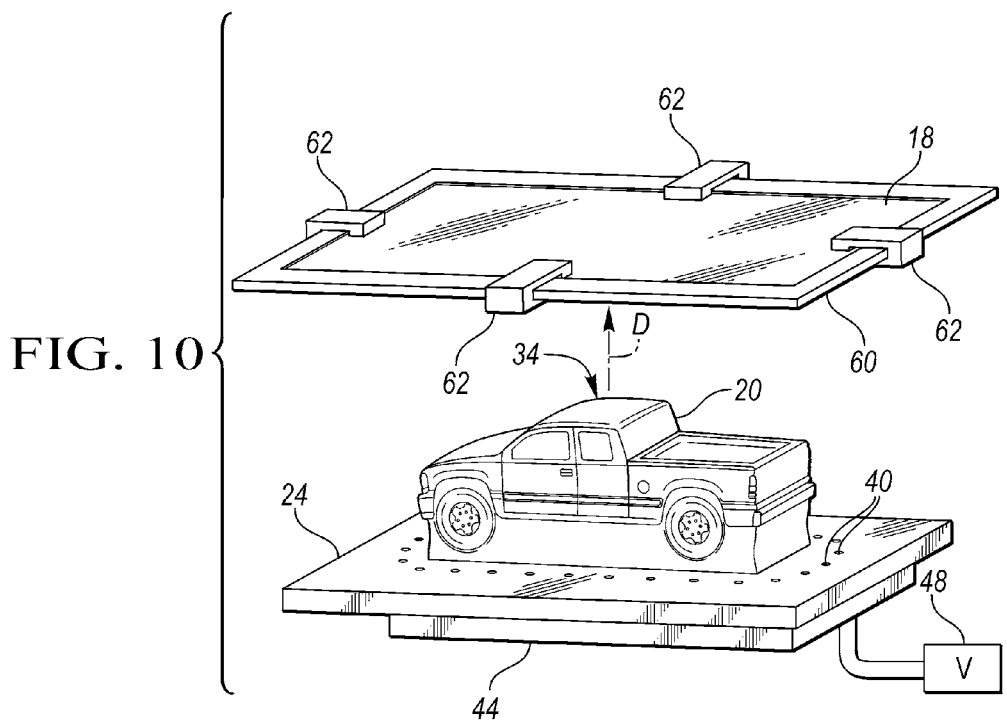
FIG. 10 is a schematic illustration in perspective view of the plastic sheet positioned above the mold assembly and base of FIG. 4 and with a vacuum source connected to the base.

With the plastic sheet 18 sufficiently heated, the flexible mold 20 is then raised into contact with the plastic sheet 18 in step 126 by moving the base 24 with the rigid core 36 and flexible mold 20 mounted thereon upward toward the sheet 18 as indicated by directional arrow D in FIG. 10. The tray 60 is held in position either manually or by a robotic arm. Alternatively, the base 24 could remain stationary and the tray 60 could be moved toward the flexible mold 20 to place the plastic sheet 18 into contact with the flexible mold 20. FIG. 11 show the plastic sheet 18 in contact with the flexible mold 20. The base 24 is continued to be moved toward the sheet 18 until the sheet 18 pulls around the flexible mold 20, and the vacuum 48 is applied in step 128. The vacuum 48 is in fluid communication with the plastic sheet 18 through the casing 44 and the series of openings 40. Accordingly, the vacuum 48 helps to pull the plastic sheet 18 against the entire outer surface 34 of the flexible mold 20 to conform the plastic sheet 18 to the contoured shape of the outer surface 34. The plastic sheet 18 is then cooled in step 130 to allow the formed shape of the plastic sheet 18 to become permanent. Cooling may be with an air source, such as a fan 70 shown in FIG. 11, or the plastic sheet 18 may be cooled passively simply by waiting a predetermined amount of time until the plastic sheet 18 reaches a predetermined temperature, such as ambient temperature, as may be determined by temperature sensors. The formed shape of the plastic sheet 18 is shown in FIG. 12.

Next, in step 132, the rigid core 36 is withdrawn from the cavity 32 in the flexible mold 20 as shown by the directional arrow E in FIG. 12. Due to the undercuts 22A, 22B, 22C (shown in FIG. 2), the flexible mold 20 will tend to be retained by the plastic sheet 18 during removal of the rigid core 36. With the rigid core 36 removed, the flexible mold 20 can more easily flex inward relative to the inner surface 23B of the inner cavity 23C of the plastic sheet 18 in step 134, in which the flexible mold 20 is withdrawn from the plastic sheet 18. Withdrawing the flexible mold 20 from the plastic sheet 18 in step 134 is accomplished by applying force F to the flexible mold 20 which need be in only a single direction as shown in FIG. 13. The force F is at 90 degrees in the embodiment shown, but may be at a different angle with respect to the base surface 26 in other embodiments, dependent on the angle of the undercut(s) of the flexible mold of the particular article to be replicated. Because the mold 20 is flexible, it flexes past the undercuts 22A, 22B, 22C of the plastic sheet 18. Arrows G1 and G2 in FIG. 13 represent the direction of inward movement of the protruding portions 28A, 28B when the mold 20 flexes past the undercuts 22A, 22B when the force F is applied in the direction shown.

Excess material of the plastic sheet 18 can then be trimmed from a perimeter P of the formed shape of the plastic sheet 18 in step 136. The perimeter P is shown in FIG. 3. The excess material is represented by the portions 74 in FIG. 13. With the object 10A now completed. The flexible mold 20 can be reused to vacuum form additional objects 10A according to the steps 116-136 of the method 100. The flexible mold 20 is less expensive than rigid molds typically required for an injection molding process that would be used for forming an article with undercuts.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. A method of vacuum forming an object comprising:
heating a plastic sheet;
after said heating the plastic sheet, applying a vacuum to conform the plastic sheet to a contoured shape of an outer surface of a flexible mold so that the plastic sheet has a formed shape that includes an undercut;
withdrawing a rigid core from a cavity in the flexible mold; and
after said withdrawing the rigid core, withdrawing the flexible mold from the plastic sheet by applying force to the flexible mold in a single direction, thereby causing flexing of the flexible mold past the undercut.

2. The method of claim 1, wherein the object is based on a model item to be replicated; wherein the model item has the contoured shape, and further comprising:
creating a female mold by:
placing the model item in a container;
pouring mold material for the female mold into the container; and
removing the model item from the container;
suspending the rigid core above the female mold in the container so that a gap exists between the female mold and the rigid core;
pouring mold material for the flexible mold into the gap to create the flexible mold having the contoured shape; and
separating the flexible mold from the female mold.

3. The method of claim 1, wherein said heating the plastic sheet is in an oven, and further comprising:
prior to said heating the plastic sheet, clamping the plastic sheet to an oven tray configured to fit at least partially in the oven; and
moving the oven tray with the plastic sheet clamped thereto into the oven; and
after said heating the plastic sheet, removing the oven tray with the plastic sheet clamped thereto from the oven.

4. The method of claim 3, further comprising:
after said heating the plastic sheet and prior to said applying the vacuum to pull the plastic sheet against the outer surface of the flexible mold, raising the flexible mold with the rigid core therein into contact with the plastic sheet.

5. The method of claim 1, further comprising:
after said heating the plastic sheet and prior to said withdrawing the rigid core, cooling the plastic sheet.

6. The method of claim 1, further comprising:
trimming excess material of the plastic sheet from a perimeter of the formed shape.

7. The method of claim 1, wherein the rigid core is mounted on a surface of a base; wherein the single direction in which force is applied to the flexible mold to withdraw the flexible mold from the plastic sheet past the undercut is perpendicular to the surface of the base.

8. A method of vacuum forming an object comprising:
clamping a plastic sheet to an oven tray;
moving the oven tray with the plastic sheet clamped thereto into an oven;
heating the plastic sheet in the oven;
removing the oven tray with the plastic sheet clamped thereto from the oven;
applying a vacuum to conform the plastic sheet to a contoured shape of an outer surface of a flexible mold so that the plastic sheet has a formed shape that includes an undercut;
after said applying the vacuum, cooling the plastic sheet;
after said cooling the plastic sheet, withdrawing a rigid core from a cavity in the flexible mold; and
after said withdrawing the rigid core, withdrawing the flexible mold from the plastic sheet by applying force to the flexible mold in a single direction, thereby causing flexing of the flexible mold past the undercut.

9. The method of claim 8, further comprising:
after said heating the plastic sheet and prior to said applying the vacuum to pull the plastic sheet against the outer surface of the flexible mold, raising the flexible mold with the rigid core therein into contact with the plastic sheet.

10. The method of claim 8, wherein the object is based on a model item to be replicated; wherein the model item has the contoured shape, and further comprising:
creating a female mold by:
placing the model item in a container;
pouring mold material for the female mold into the container; and
removing the model item from the container;
suspending the rigid core above the female mold in the container so that a gap exists between the female mold and the rigid core;
pouring mold material for the flexible mold into the gap to create the flexible mold having the contoured shape; and
separating the flexible mold from the female mold.

11. The method of claim 8, further comprising:
trimming excess material of the plastic sheet from a perimeter of the formed shape.

12. The method of claim 8, wherein the the rigid core is mounted on a surface of a base wherein the single direction in which the force is applied to the flexible mold to withdraw the flexible mold from the plastic sheet past the undercut is perpendicular to the surface of the base.

\* \* \* \* \*